(12) United States Patent
Norström et al.

(10) Patent No.: US 7,118,312 B2
(45) Date of Patent: Oct. 10, 2006

(54) DOUBLE-SIDED INDEXABLE CUTTING INSERT AND METHOD OF MANUFACTURE

(75) Inventors: Thomas Norström, Fagersta (SE); Mats Jonsson, Hedemora (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/518,637

(22) PCT Filed: Jun. 24, 2004

(86) PCT No.: PCT/SE2003/001104

§ 371 (c)(1),
(2), (4) Date: Apr. 29, 2005

(87) PCT Pub. No.: WO2004/002664

PCT Pub. Date: Jan. 8, 2004

(65) Prior Publication Data

US 2005/0254908 A1     Nov. 17, 2005

(30) Foreign Application Priority Data

Jun. 26, 2002   (SE) .................................. 0201985

(51) Int. Cl.
*B23B 27/16* (2006.01)
(52) U.S. Cl. ....................... 407/113; 407/114
(58) Field of Classification Search ................ 407/113, 407/114, 115, 116, 101, 110, 30, 40
See application file for complete search history.

(56) References Cited

U.S. PATENT DOCUMENTS

| | | | |
|---|---|---|---|
| 3,229,349 A | | 1/1966 | Leksell |
| 3,955,259 A | * | 5/1976 | Gustafsson ................... 407/37 |
| 4,074,949 A | | 2/1978 | Hochmuth et al. |
| 4,294,566 A | | 10/1981 | Boone |
| 4,616,962 A | * | 10/1986 | Ushijima et al. ........... 407/113 |
| 4,643,620 A | * | 2/1987 | Fujii et al. .................. 407/119 |
| 4,681,488 A | * | 7/1987 | Markusson ................. 407/114 |

(Continued)

FOREIGN PATENT DOCUMENTS

GB        1 443 743        7/1976

(Continued)

*Primary Examiner*—Willmon Fridie, Jr.
(74) *Attorney, Agent, or Firm*—Drinker Biddle & Reath LLP

(57) ABSTRACT

A double-sided indexable cutting insert includes a top side and a bottom side interconnected by an edge surface. A plurality of upper major cutting edges are formed at a transition between the top side and the edge surface, and a plurality of lower major cutting edges are formed at a transition between the bottom side and the edge surface. Adjacently situated major cutting edges at each of the top and bottom sides are interconnected by corner cutting edges disposed along respective corners of the insert. Each corner cutting edge includes a minor cutting edge and a nose cutting edge. The nose cutting edge extends to the respective minor cutting edge from a respective major cutting edge. A portion of the edge surface disposed to one side of a bisector of each corner extends from a nose cutting edge of the top side towards a minor cutting edge on the bottom side and forms a downwardly facing step substantially midway between the top and bottom sides. A portion of the edge surface disposed to the other side of the bisector of the same corner extending from a nose cutting edge of the bottom side towards a minor cutting edge of the top side and forming an upwardly facing step substantially midway between the top and bottom sides.

12 Claims, 5 Drawing Sheets

U.S. PATENT DOCUMENTS 5,365,805 A * 11/1994 Pantzar et al. ............. 76/101.1
5,454,670 A    10/1995 Noda et al.
5,643,523 A *  7/1997 Simpson .................... 264/400

FOREIGN PATENT DOCUMENTS

WO    WO 00/47405    8/2000

* cited by examiner

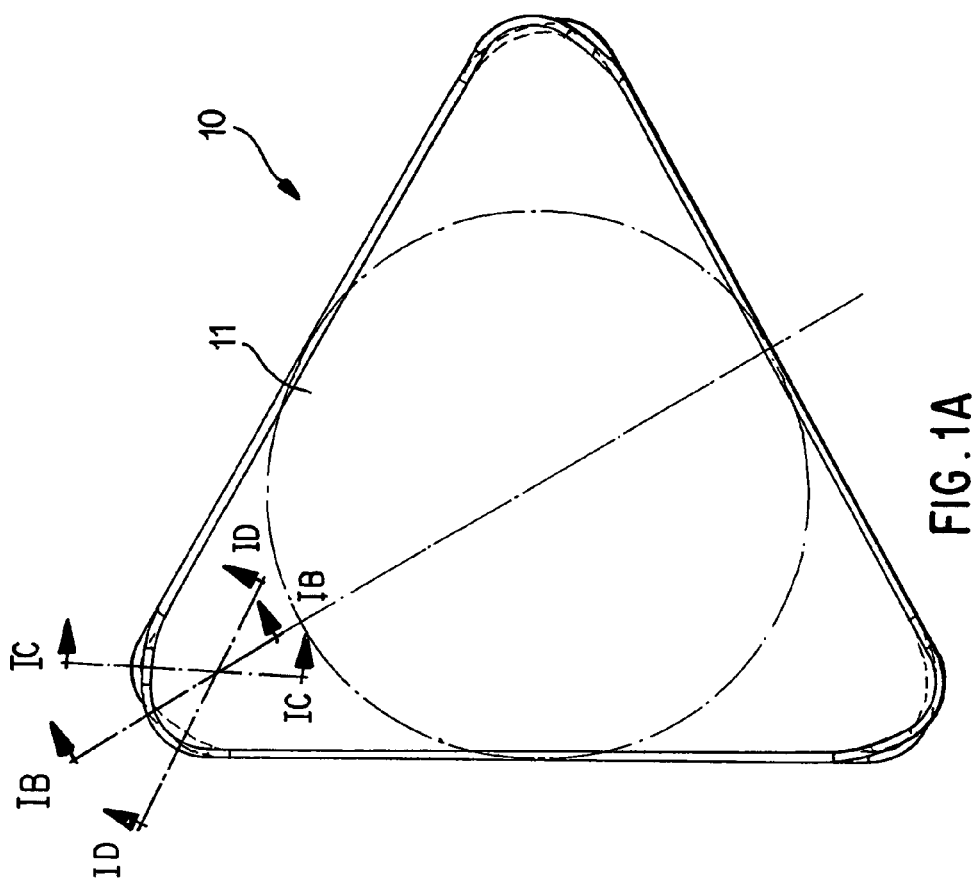
FIG. 1A
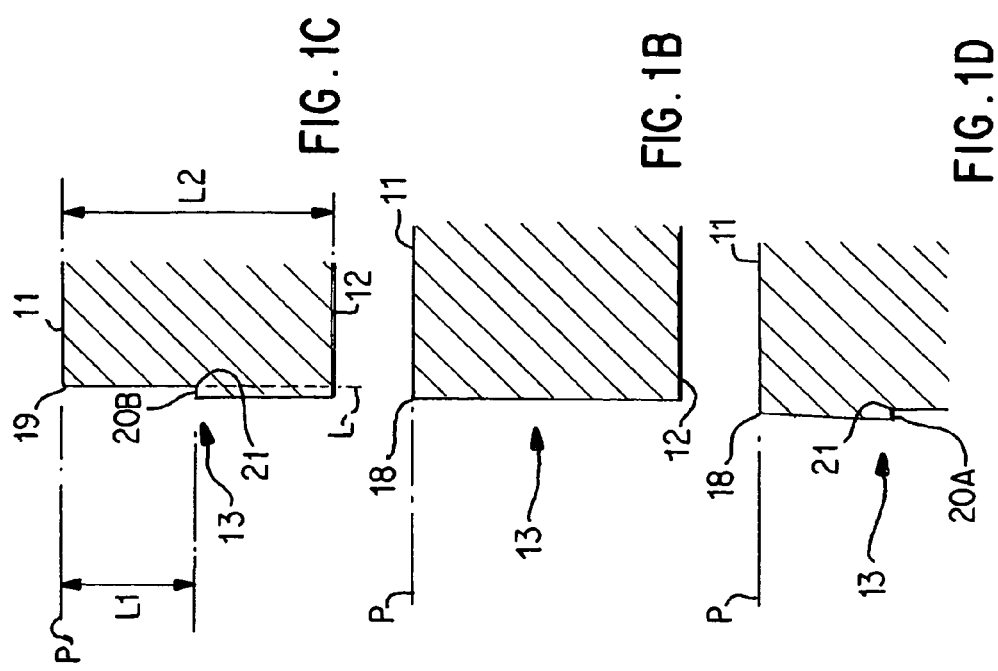
FIG. 1C
FIG. 1B
FIG. 1D

DOUBLE-SIDED INDEXABLE CUTTING INSERT AND METHOD OF MANUFACTURE

FIELD OF THE INVENTION

The present invention relates to a cutting insert for chip removing machining and a method for manufacturing the cutting insert.

BACKGROUND OF THE INVENTION

In tools for metalworking, indexable, asymmetrical inserts of hard and wear-resistant materials are used, such as cemented carbide or cubic boron nitride (CBN). There are a number of embodiments of cutting inserts for use in only one feeding direction. These are usually denominated right or left hand inserts and comprise peripheries and/or chip breakers having an asymmetrical shape in relation to the bisector of a cutting corner. These cutting inserts are adapted for only one feeding direction.

Examples of indexable inserts having asymmetrical cutting corners are shown in U.S. Pat. No. 3,955,259, SE 517274 (corresponding to WO 0047405), GB 1443743 and U.S. Pat. No. 3,229,349.

OBJECTS OF THE INVENTION

One object of the present invention is to provide a cutting insert that has a plurality of feeding directions.

Another object of the present invention is to provide such an indexable cutting insert that only is of left or right hand design.

Another additional object of the present invention is to provide a cutting insert, which can utilize both sides of the cutting insert for cutting.

Another additional object of the present invention is to provide an efficient method for manufacturing the cutting insert.

This is realized by a double-sided indexable cutting insert for chip removing machining. The insert comprises a negative, generally polygonal body having a plurality of cutting corners. The body has a top side and a bottom side interconnected by an edge surface. A plurality of upper major cutting edges are formed at a transition between the top side and the edge surface. A plurality of major lower cutting edges are formed at a transition between the bottom side and the edge surface. Adjacently situated major cutting edges at each of the top and bottom sides are interconnected by corner cutting edges which are disposed along respective corners of the insert. Each corner cutting edge comprises a minor cutting edge and a nose cutting edge. The nose cutting edge extends to the respective minor cutting edge from a respective major cutting edge. A bisector of each corner cutting edge intersects the nose cutting edge. Each corner cutting edge is asymmetrical with respect to its respective bisector. The nose cutting edge of each corner cutting edge is defined by a first radius, and the minor cutting edge is defined by a second radius which is longer than the first radius. The nose cutting edges of the top side at least touch a common top plane. The nose cutting edges of the bottom side at least touch a common bottom plane oriented parallel to the top plane. An imaginary line extending perpendicularly to the top and bottom planes and intersecting the main cutting edge of any cutting corner at a location in-between opposite ends of such minor cutting edge, passes through the body.

The present invention also relates to a method of manufacturing a double-sided, indexable cutting insert for chip removing machining from a plate of a hardware-resistant material. The plate has a thickness defined between top and bottom sides. The plate is of generally polygonal shape defining a plurality of corners. The method comprises the steps of:

A) fastening the plate in a fixture;

B) machining a first corner of the plate along a portion thereof extending from the top side for about one-half of the plate thickness, to form a curved edge surface portion, and a top curved corner cutting edge comprised of a top nose cutting edge and a top minor cutting edge;

C) inverting the plate in the fixture to reverse the positions of the top and bottom sides;

D) machining a remaining portion of the first corner to form another curved edge surface portion, and a bottom curved corner cutting edge comprised of a bottom nose cutting edge and a bottom minor cutting edge, wherein the bottom nose cutting edge is situated opposite the top minor cutting edge, and the bottom minor cutting edge is situated opposite the top nose cutting edge, and wherein an imaginary line which extends perpendicular to top and bottom parallel planes that are touched by respective top and bottom nose cutting edges, and which intersects either of the minor cutting edges at a location in between opposite ends of such minor cutting edge, passes through the plate; and E) performing steps B and D on a second corner of the plate to render the insert indexable.

BRIEF DESCRIPTION OF THE DRAWINGS

An embodiment of the indexable insert according to the present invention is described below, reference being made to the appended drawings, wherein;

FIG. 1 shows a planar view of a triangular indexable insert according to the present invention.

FIG. 1B shows a cross-section of the indexable insert according to the line IB—IB in FIG. 1A.

FIG. 1C shows a cross-section of the indexable insert according to the line IC—IC in FIG. 1A.

FIG. 1D shows a cross-section of the indexable insert according to the line ID—ID in FIG. 1A.

DETAILED DESCRIPTION OF PREFERRED EMBODIMENTS OF THE INVENTION

Figure 1E:
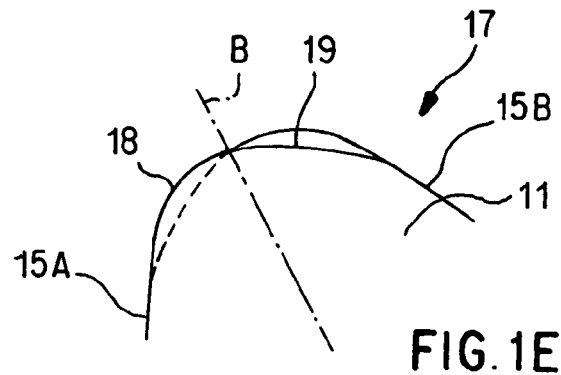
FIG. 1E shows an enlargement of a cutting corner of FIG. 1A.
Figure 1F:
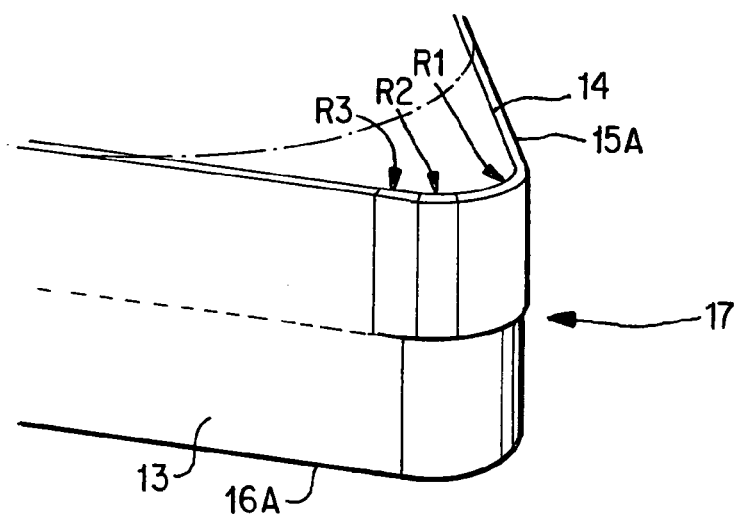
FIG. 1F shows the cutting corner in perspective view.
Figure 1G:
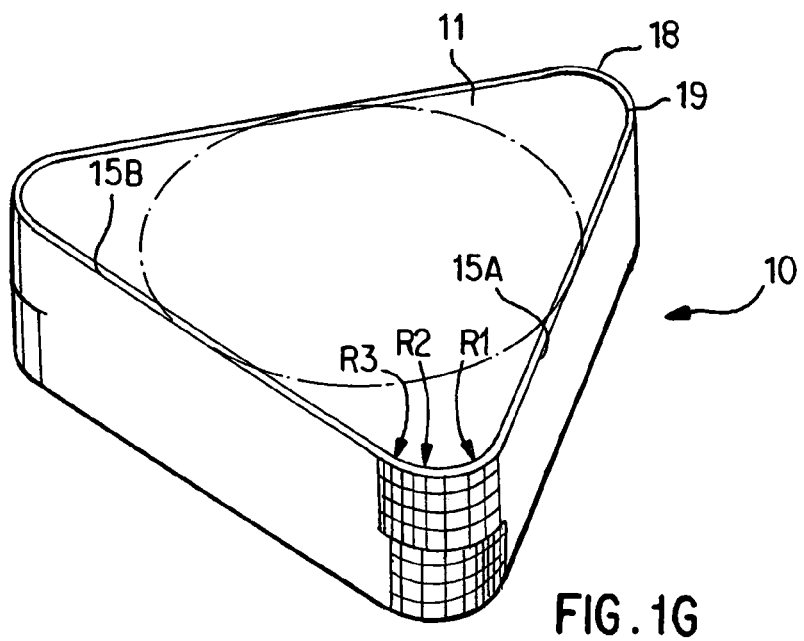
FIG. 1G shows the indexable insert in perspective view.

The indexable insert 10 in FIGS. 1A–1G is intended for turning or milling. The cutting insert, which is shown in right hand design, has a substantially triangular basic shape and comprises a top side 11, a bottom side 12, and three edge surfaces 13, which substantially connects the top and bottom sides 11 and 12, respectively. The cutting insert 10 has a negative geometry, i.e. each edge surface 13 is perpendicular to a plane P, which coincides with the top side 11 or the bottom side 12, which means that the cutting insert has a substantially constant clearance angle around the cutting insert, also in the cutting corners. The cutting insert consists of sintered cemented carbide (for instance WC+Co) or cubic boron nitride (CBN) or a combination of CBN and cemented carbide where the cutting corners consist of CBN plates that are bonded at the corners. The top side 11 constitutes rake face and the edge surface 13 constitutes edge surface. Upper major cutting edges 15A are formed at transitions between the top side 11 and the edge surfaces 13 of the cutting insert. Lower cutting edges 16A are formed at transitions between the bottom side 12 and the edge surfaces 13. Said sides 11, 12 constitute a rake face in a position when the side 11 is active in chip forming machining and a support surface when the cutting insert has been turned upside down. Each side 11, 12 comprises a planar surface, the periphery of which may be provided with an edge strengthening chamfer 14.

The cutting insert 10 has three cutting corners 17. Each cutting corner 17 comprises a nose edge 18 and a minor cutting edge 19. The nose edge 18 connects to the connected major cutting edge 15A and to the connected minor cutting edge 19. The minor cutting edge 19, which also may be called finishing edge or wiper, in turn connects to a non-associated major cutting edge 15B.

The cutting corner 17 has a bisector B dividing the corner into equal parts (30 degrees each, in this case) in relation to the major cutting edges 15A, 15B.

The bisector B intersects the nose edge 18, at both the top and the bottom sides 11, 12. Each cutting corner 17 is asymmetrical in relation to the bisector B in regards of the geometry of the edges 15A, 18, 19 and 15B.

The nose edge 18 is curved and may be defined by a radius R1. The minor cutting edge 19 is curved and may be defined by a radius R2. The radius R1 is smaller than the radius R2 of the minor cutting edge. The minor cutting edge 19 connects to the non-associated major cutting edge 15B with a radius R3. The radius R3 is smaller than the radius R2 of the minor cutting edge but larger than the radius R1.

Each side 11, 12 comprises three nose edges, which at least partly touch a plane P. The plane P is in this case parallel with both the top and the bottom sides.

An imaginary line L (see FIG. 1C), which is perpendicular to the plane P and tangent to the minor cutting edge 19, intersects the edge surface 13 at a distance L1 from the minor cutting edge. The distance L1 equals about half of the thickness L2 of the cutting insert, FIG. 1G. The line L coincides with the edge surface 13 for about half of the thickness L2 of the cutting insert. The edge surface 13 has a step 20A, 20B on both sides of the bisector of the cutting corner. The step 20A, 20B is substantially parallel with the plane P. The step 20A, 20B forms a sharp corner 21 with the edge surface 13 next to the step 20A, 20B in order to constitute an indication of fracture that at a possible breaking of the cutting edge controls the breakage and keeps the lower part of the cutting insert intact.

A direction oriented, double-sided wiper insert having only 3 radii in the cutting corner has the advantage that it is possible to form a radius or shoulder in a workpiece 30 to an exact geometry without the need for compensation in the NC program, i.e. the cutting insert leaves the workpiece having the same geometrical shape as a standard turning insert having a nose edge according to the ISO standard. This at the same time as the cutting insert has a wiper effect at longitudinal turning. i.e. the cutting insert leaves the workpiece having the same geometrical shape as a standard turning insert having a nose radius according to the standardized norm. Furthermore, a cutting insert formed in such a way provides lower radial cutting forces, which is desirable at generation of fine surfaces, than a traditional wiper insert having 5 radii after each other.

Thus, the invention aims at getting away from this type of problem by forming only half of the thickness, and thereby obtaining a double-sided wiper insert that only is of left or right hand design. The step 20A, 20B protects the subjacent edge in an effective way. Since the cutting inserts are expensive, such as CBN inserts, the operator often machines too long. Without a wiper, this entails numerous measurement corrections in the turning lathe. The CBN insert maintains the measurements well, even after considerable wear. Finally, it breaks down. The indexable insert according to the present invention ensures that the cutting edge below is protected.

Figure 2A:
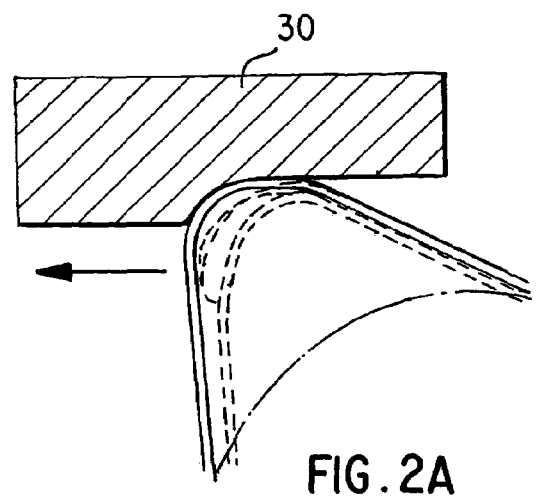
FIG. 2A shows the indexable insert during longitudinal turning in a workpiece.
Figure 2B:
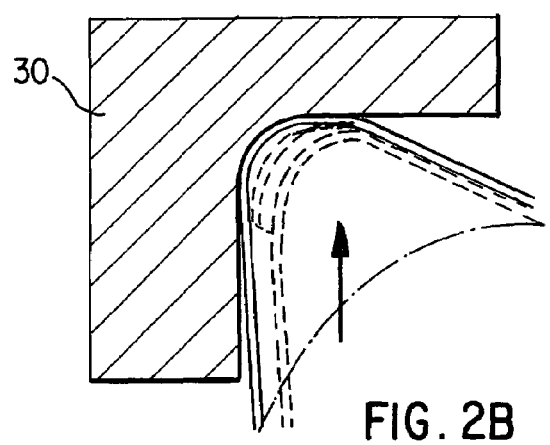
FIG. 2B shows the indexable insert during transverse turning in a workpiece.
Figure 2C:
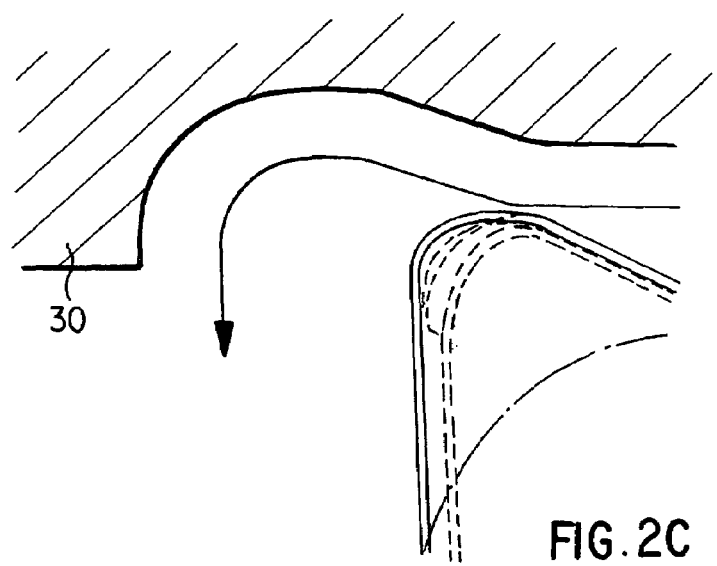
FIG. 2C shows the indexable insert while copying a workpiece on a lathe.
Figure 3A:
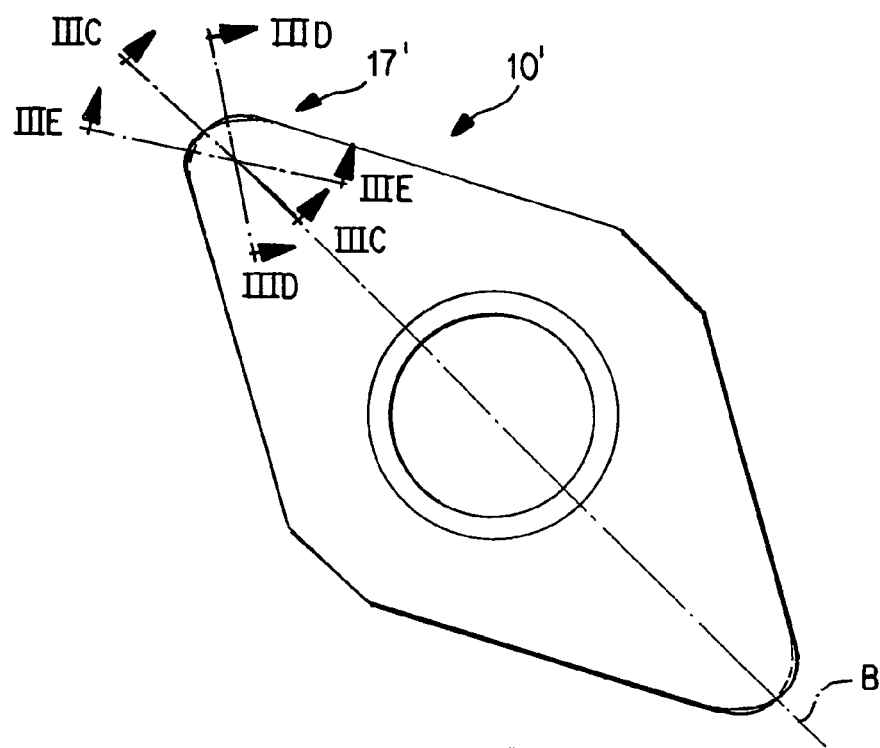
FIG. 3A shows a planar view of a rhombic indexable insert according to the present invention.
Figure 3B:
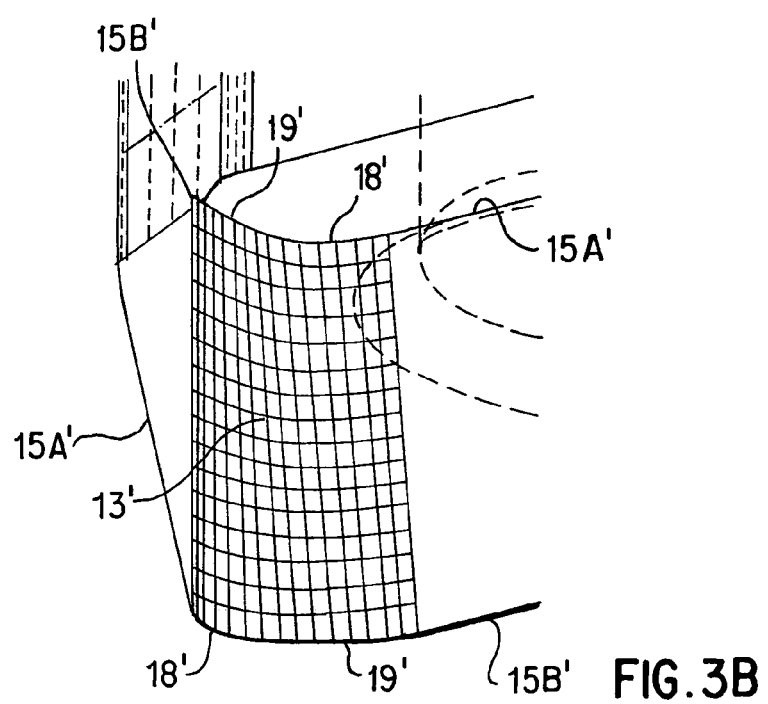
FIG. 3B shows an enlargement of a cutting corner of FIG. 3A in perspective view.
Figure 3D:
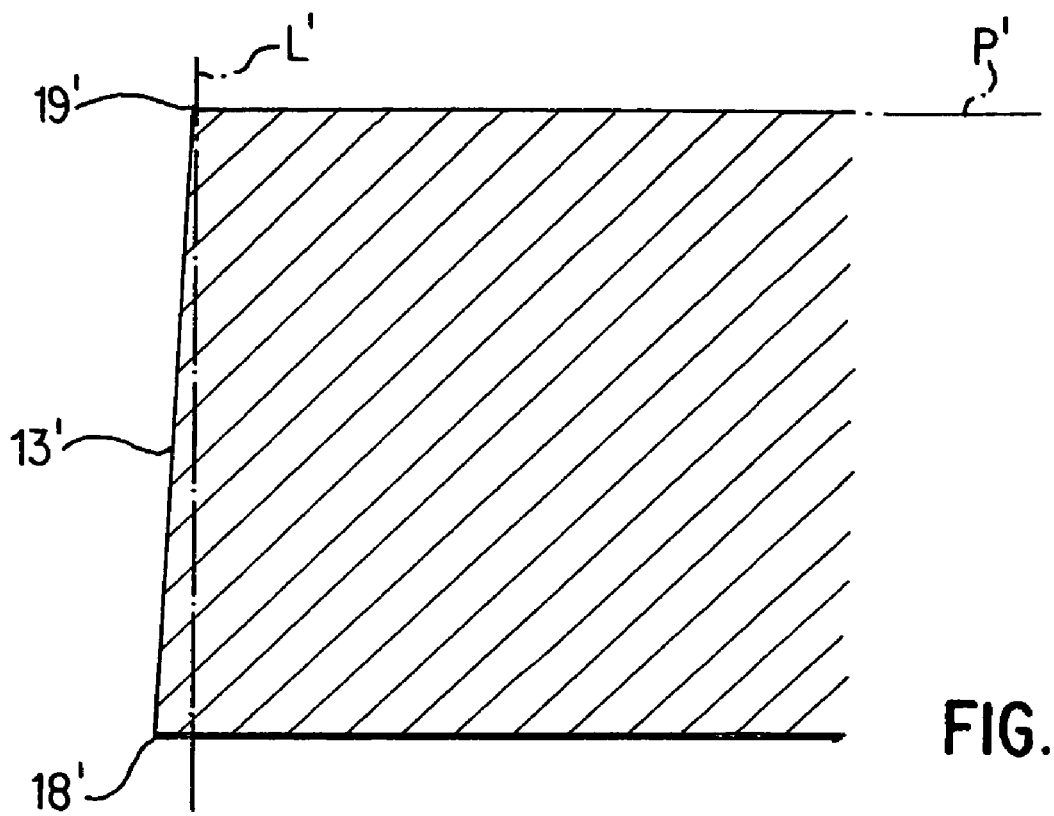
FIG. 3D shows a cross-section of the indexable insert according to the line IC—IC in FIG. 1A.
Figure 3C:
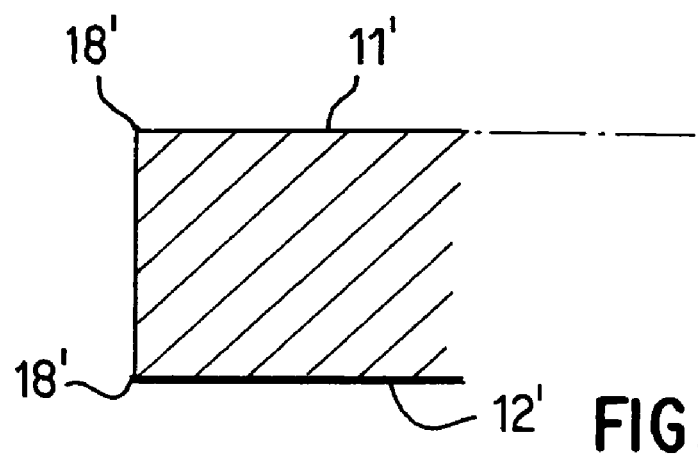
FIG. 3C shows a cross-section of the indexable insert according to the line IIIC—IIIC in FIG. 3A
Figure 3E:
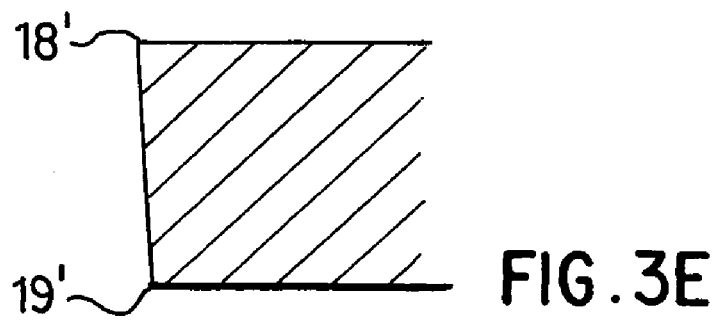
FIG. 3E shows a cross-section of the indexable insert according to the line IIIE—IIIE in FIG. 1A.

FIG. 2A shows the indexable insert at longitudinal turning of the workpiece 30 with the feeding direction according to the arrow in FIG. 2A. FIG. 2B shows the indexable insert 10 at transverse turning of the workpiece 30, wherein the minor cutting edge substantially does not machine the same. FIG. 2C shows the indexable insert during copying of the workpiece 30 on a lathe.

In all the machining examples, the cutting insert has been mounted in insert holders with a setting angle of 93°, and a clearance angle and minor insert angle of 6° each.

The indexable insert 10 is manufactured in the following way. A polygonal plate of a hard wear-resistant material such as CBN, having a thickness L2 and equally large side surfaces, is fastened in a fixture. The edge surfaces are ground over the entire thickness in a conventional way. At least a first corner portion is machined, preferably by means of grinding, so that a first area, corresponding to approximately half the thickness, obtains a rounded nose edge 18 and a minor cutting edge 19. It is suitable to perform the corresponding machining on the other corner portions of the plate and then turn the polygonal plate upside down 180°. The plate is fastened in the fixture again in order to machine some of the corner portions, at least the first corner portion, preferably by means of grinding, so that a second area, corresponding to approximately half of the thickness, obtains a rounded nose edge 18 and a minor cutting edge 19. Then, it is advantageous to machine the nose edge 18 so that it obtains a radius R1 that is smaller than the radius R2 of the minor cutting edge. It is most suitable to grind all corner portions of one of the halves in one set-up.

The indexable insert 10' in FIGS. 3A–3E is intended for turning or milling. The cutting insert has a substantially rhombic basic shape with two cutting corners 17' and four cutting edge portions. Equally indexed reference numbers designate equal details mentioned above. What makes this cutting insert 10' different from the above-described cutting insert 10, in addition to the basic shape, is the shape of the edge surface 13' in the cutting corner 17'. This cutting insert 10 is injection-molded or directly pressed and the edge surface 13' in the cutting corner has a continuous or stepless transition between the opposite cutting edges in a cutting corner. The cutting corner 17 has a nose edge 18' and a minor cutting edge 19'. The nose edge 18' connects to the associated major cutting edge 15A' and to the associated minor cutting edge 19'. The minor cutting edge 19' in turn connects to a non-associated major cutting edge 15B'. An imaginary line L', which is perpendicular to the plane P' and tangent to the minor cutting edge 19' intersects the edge surface 13' according to FIG. 3D. A line, corresponding to the line L', which is tangent to both of the nose edges 18', runs at a distance from the centre of the edge surface 13', in the plane of the bisector B, according to FIG. 3C. In the illustrated cutting insert 10', the edge surface 13' is concave.

Furthermore, the cutting insert 10' has a through hole intended to receive a fixing screw (not shown), which fixes the cutting insert 10' to the insert holder.

Thus, the present invention relates to an indexable, asymmetrical cutting insert, which is of only left or only right hand design that permits utilization of both sides of the cutting insert for machining in the same direction. Furthermore, an efficient method for manufacturing the double-sided cutting insert is provided.

The invention is in no way limited to the embodiment described above, but may be varied within the scope of the appended claims. The cutting insert may have another polygonal basic shape, such as a square, rectangular, pentagonal, hexagonal or octagonal basic shape. The cutting insert 10 may be provided with a through hole intended to receive a fixing screw.

The invention claimed is:

1. A double-sided indexable cutting insert for chip removing machining; the insert comprising a negative, generally polygonal body having a plurality of corners; the body having a top side and a bottom side interconnected by an edge surface; a plurality of upper major cutting edges formed at a transition between the top side and the edge surface; a plurality of lower major cutting edges formed at a transition between the bottom side and the edge surface; adjacently situated major cutting edges at each of the top and bottom sides being interconnected by corner cutting edges disposed along respective corners of the insert; each corner cutting edge comprising a minor cutting edge and a nose cutting edge; the nose cutting edge extending to the respective minor cutting edge from a respective major cutting edge; a bisector of each corner cutting edge intersecting the nose cutting edge; each corner cutting edge being asymmetrical with respect to its respective bisector; the nose cutting edge of each corner cutting edge defined by a first radius, and the respective minor cutting edge defined by a second radius longer than the first radius; the nose cutting edges of the top side at least touching a common top plane; the nose cutting edges of the bottom side at least touching a common bottom plane oriented parallel to the top plane; wherein an imaginary line which extends perpendicular to the top and bottom planes and which intersects the minor cutting edge of any cutting corner at a location in-between opposite ends of such minor cutting edge, passes through the body.

2. The cutting insert according to claim 1 wherein the imaginary line intersects the edge surface at a location substantially midway between the top and bottom surfaces.

3. The cutting insert according to claim 2 wherein the imaginary line coincides with the edge surface until it intersects the body.

4. A double-sided indexable cutting insert for chip removing machining; the insert comprising a negative, generally polygonal body having a plurality of corners; the body having a top side and a bottom side interconnected by an edge surface; a plurality of upper major cutting edges formed at a transition between the top side and the edge surface; a plurality of lower major cutting edges formed at a transition between the bottom side and the edge surface; adjacently situated major cutting edges at each of the top and bottom sides being interconnected by corner cutting edges disposed alone respective corners of the insert; each corner cutting edge comprising a minor cutting edge and a nose cutting edge; the nose cutting edge extending to the respective minor cutting edge from a respective major cutting edge; a bisector of each corner cutting edge intersecting the nose cutting edge; each corner cutting edge being asymmetrical with respect to its respective bisector; the nose cutting edge of each corner cutting edge defined by a first radius, and the respective minor cutting edge defined by a second radius longer than the first radius; the nose cutting edges of the top side at least touching a common top plane; the nose cutting edges of the bottom side at least touching a common bottom plane oriented parallel to the top plane; wherein an imaginary line which extends perpendicular to the top and bottom planes and which intersects the minor cutting edge of any cutting corner at a location in-between opposite ends of such minor cutting edge, passes through the body, wherein a portion of the edge surface disposed to one side of the bisector of each corner extends from a nose cutting edge of the top side towards a minor cutting edge on the bottom side and forms a downwardly facing step substantially midway between the top and bottom sides; a portion of the edge surface disposed to the other side of the bisector of the same corner extending from a nose cutting edge of the bottom side towards a minor cutting edge of the top side and forming an upwardly facing step substantially midway between the top and bottom sides.

5. The cutting insert according to claim 4 wherein each step is substantially parallel to the top and bottom sides.

6. The cutting insert according to claim 5 wherein each step forms an angle of substantially ninety degrees with the imaginary line.

7. The cutting insert according to claim 1 wherein the edge surface forms a clearance angle with each of the top and bottom sides, the clearance angles being constant around the periphery of the insert.

8. The cutting insert according to claim 1 wherein the entire insert comprises cubic boron nitride (CBN).

9. The cutting insert according to claim 8 wherein the insert comprises a combination of cubic boron nitride (CBN) and cemented carbide, with the cutting corners comprised of brazed-on CBN plates.

10. A method of manufacturing a double-sided, indexible cutting insert for chip removing machining from a plate of a hard wear-resistant material having a thickness defined between top and bottom sides, the plate being of generally polygonal shape defining a plurality of corners, the method comprising the steps of:

A) fastening the plate in a fixture;

B) machining a first corner of the plate along a portion thereof extending from the top side for about one-half of the plate thickness, to form a curved edge surface portion and a top curved corner cutting edge comprised of a top nose cutting edge and a top minor cutting edge;

C) inverting the plate in the fixture to reverse the positions of the top and bottom sides;

D) machining the first corner along a remaining portion thereof to form another curved edge surface portion, and a bottom curved corner cutting edge comprised of a bottom nose cutting edge and a bottom minor cutting edge, wherein the bottom nose cutting edge is situated opposite the top minor cutting edge, and the bottom minor cutting edge is situated opposite the top nose cutting edge, and wherein an imaginary line extends perpendicular to top and bottom parallel planes that are touched by respective top and bottom nose cutting edges, and intersects either of the minor cutting edges at a location in between opposite ends of such minor cutting edge, the imaginary line passing through the plate; and E) performing steps B and D on a second corner of the plate to render the insert indexible.

11. The method according to claim 10 wherein the machining in steps B and D comprises grinding.

12. The method according to claim 10 wherein steps B and D further comprise forming the top and bottom nose cutting edges having a first radius and forming the top and bottom minor cutting edges having a second radius longer than the first radius.

* * * * *